(12) United States Patent
Hare

(10) Patent No.: US 10,093,245 B2
(45) Date of Patent: Oct. 9, 2018

(54) UNIVERSAL ACCESSORY MOUNT AND CONSTRUCTION

(71) Applicant: Addictive Desert Designs, LLC, Mesa, AZ (US)

(72) Inventor: Jared A. Hare, Mesa, AZ (US)

(73) Assignee: Addictive Desert Designs, LLC, Mesa, AZ (US)

( * ) Notice: Subject to any disclaimer, the term of this patent is extended or adjusted under 35 U.S.C. 154(b) by 0 days.

(21) Appl. No.: 15/792,704

(22) Filed: Oct. 24, 2017

(65) Prior Publication Data

US 2018/0043839 A1    Feb. 15, 2018

Related U.S. Application Data

(63) Continuation of application No. 14/929,562, filed on Nov. 2, 2015, now Pat. No. 9,796,343.

(51) Int. Cl.
| | |
|---|---|
| *B60R 11/00* | (2006.01) |
| *B60Q 1/04* | (2006.01) |
| *B60Q 1/18* | (2006.01) |
| *B60R 11/04* | (2006.01) |
| *B60R 11/02* | (2006.01) |

(52) U.S. Cl.
CPC ............ *B60R 11/00* (2013.01); *B60Q 1/0483* (2013.01); *B60Q 1/18* (2013.01); *B60R 11/0217* (2013.01); *B60R 11/04* (2013.01); *B60Q 2900/10* (2013.01); *B60R 2011/004* (2013.01)

(58) Field of Classification Search
USPC ............ 248/220.21, 220.22, 223.31, 220.31, 248/220.41, 201, 674, 675
See application file for complete search history.

(56) References Cited

U.S. PATENT DOCUMENTS

| | | | | |
|---|---|---|---|---|
| 4,358,037 A | * | 11/1982 | Heideman ............... | B60R 9/045 224/321 |
| 4,447,049 A | * | 5/1984 | Rudy ........................ | B25B 5/14 211/117 |
| 4,616,771 A | * | 10/1986 | Heideman ............... | B60R 9/045 224/321 |
| 5,487,518 A | * | 1/1996 | McCraney ................ | F24H 9/06 248/225.11 |
| 7,014,052 B2 | * | 3/2006 | Dettorre ................ | A47F 5/0838 211/18 |
| 2004/0206880 A1 | * | 10/2004 | Henley .................. | A61B 6/035 248/675 |

* cited by examiner

*Primary Examiner* — Steven M Marsh
(74) *Attorney, Agent, or Firm* — Venjuris P.C.; Michael F. Campillo (57) ABSTRACT

A universal accessory mount having bracket mounting portions and spacing segments that are configurable together to match the shape or curve of the vehicle exterior or other aftermarket vehicle accessory. Right-side and left-side and U-shaped brackets are each attachable to the bracket mounting portions to accommodate vehicle accessories of varying dimensions.

19 Claims, 14 Drawing Sheets

UNIVERSAL ACCESSORY MOUNT AND CONSTRUCTION

FIELD OF THE INVENTION

The present invention relates to accessory mounts for vehicles, and in particular, accessory mount systems compatible with automotive aftermarket products such as, but not limited to, aftermarket lighting, cameras, or speakers.

BACKGROUND OF THE INVENTION

Vehicles may be adorned or outfitted with aftermarket accessories to improve the look or utility of a vehicle. For example, an accessory such as lighting may be available from manufacturers in the form of a light-bar comprised of multiple light units, attached to or within, a housing that is mountable to the vehicle body, or individual lighting units that must be separately mounted to the vehicle body. Mounting lighting as described however, requires alteration of the vehicle body, which can void warranties, be difficult for most vehicle owners, or be cost prohibitive if the vehicle owner chooses to pay a third party installer to attach the lighting accessory. Further adding to the difficulty is the differing dimensions of accessories and the associated mounting hardware and/or requirements of the accessories from different manufactures. Accordingly, there is a need for an improved accessory mount structure or system that accommodates many alternately designed and dimensioned aftermarket accessories and the associated mounting requirements.

SUMMARY OF THE INVENTION

The accessory mount comprises a device, kit, apparatus, and method for improving vehicles by supplementing a vehicle with an aftermarket accessory having an accessory mount construction according to the invention. Aspects of the invention can be embodied in an accessory mount for a vehicle exterior or vehicle aftermarket accessory to include a mounting base comprised of a plurality of spacing segments and a plurality of bracket mounting portions, each bracket mounting portion having a base mounting slot and fixed to a first spacing segment on a first side of the bracket mounting portion and fixed to a second spacing segment on a second side of the bracket mounting portion; and a first bracket and a second bracket, each respectively attachable to one of the base mounting slots in one of the plurality of bracket mounting portions. An accessory having a length may be mounted between the first bracket and the second bracket by attachment of the first bracket to a first base mounting slot and attachment of the second mounting bracket to a second base mounting slot and wherein if the accessory has an alternate length it may be alternately mounted between the first bracket and the second bracket by attachment of at least one of the first bracket or second bracket to an alternate base mounting slot. Further, the bracket mounting portions and spacing segments are fixed together to have the same shape as the vehicle exterior or vehicle aftermarket accessory.

Aspects of the invention include embodiments wherein the base mounting slots are oriented in a first direction and the first bracket and second bracket each have a bracket base mounting slot that are oriented in at least a second direction when attached to respective base mounting slots. Additionally, the first direction may be aligned with the longest dimension of the base mounting slot and the second direction may be aligned with the longest dimension of the bracket mounting slot and the second direction may be between about 40 degrees and 140 degrees relative to the first direction. It is preferred that first direction and second direction are substantially orthogonal. Moreover, and similarly, each base mounting slot may include two arcs, with each arc on alternate ends of a slot-shaped aperture that extends through the bracket mounting portion, and the bracket mounting slot may have two arcs, each arc on alternate ends of a slot-shaped aperture that extends through a bracket base.

Aspects also include an accessory mount wherein the first bracket comprises a right-side L-shaped bracket and the second bracket comprises a left-side L-shaped bracket. The right-side L-shaped bracket and the left-side L-shaped bracket may each have a substantially flat bracket base that contacts and is attachable to the bracket mounting portion and the bracket base may have a bracket base perimeter and a bracket mounting slot within the bracket base perimeter, and be positioned in contact so that a portion of the bracket mounting slot aligns with the base mounting slot to receive a fastener to attach the right-side L-shaped bracket and the left-side L-shaped bracket to the mounting base. The bracket base perimeter may be many alternate shapes that permit the inclusion of bracket mounting slots but is substantially trapezoidal. The right-side L-shaped bracket and the left-side L-shaped bracket may each have a bracket mount arm that extends substantially perpendicularly from an edge of the bracket base perimeter. Each bracket base perimeter may also be many alternate shapes but is preferably substantially trapezoidal and constructed so that the bracket base mounting slot is adjacent along an edge of the bracket base perimeter and the bracket mount arm extends substantially perpendicularly from a substantially opposite edge of the bracket base perimeter. Aspects further include embodiments wherein the bracket mounting portions are many alternate shapes but preferably hexagonal whereas the spacing segments are substantially rectangular.

DESCRIPTION OF PREFERRED EMBODIMENTS

The figures illustrate an embodiment of an accessory mount according to the description and claims that follow. In general, the accessory mount is adaptable and modularly constructed to be fixed to any of a variety of vehicle exteriors or vehicle aftermarket accessories. As further explanation, the modular construction of the accessory mount enables construction, configuration or design of the accessory mount to match many of the varieties of contours or shapes that may be found on a vehicle accessory or a vehicle exterior such as those vehicle exteriors that can be selected from the group consisting of vehicle body parts such as cab-roofs, or fenders, bumpers, grills, and roof-racks.

The accessory mount described herein can be configured and fixed to a variety of aftermarket vehicle accessories, such as a bumpers, racing-racks, bed-racks or roof-racks. In each case, the accessory mount is constructed or configured and fixed to the aftermarket vehicle accessory to match the curve, shape, or design of the aftermarket vehicle accessory. Some truck body styles for example, have cabs that have a front roof portion that curves or bows rearward towards the rear of the truck to match the overall styling of the truck. The accessory mount herein can be configured and mounted on a roof-rack that matches the curve, bow, styling, or design of the front roof portion and complement or augment the utility or aesthetics of the vehicle by attachment of accessories such as, but not limited to, lighting, speakers, or cameras. As another example, the figures illustrate an embodiment of the accessory mount configured to match the curve, shape, and styling of beam of a vehicle bumper and fixed thereto. Alternate configurations of the accessory mount are constructed for alternate vehicle surface designs or aftermarket vehicle accessory designs and each configuration is achievable with the teachings and description herein or modest modifications thereof. The flexibility and modularity of the accessory mount permits that various shapes, contours, or curves can be matched whether on the vehicle surface or on an aftermarket vehicle accessory that is attachable to a vehicle. Thus, accessory mounts according to the description are configurable for vehicle exteriors and vehicle accessories of all types including, but not limited to, original or aftermarket bumpers, fenders, or racks.

The accessory mount may be generally described as a substantially flat metal platform that is attachable to a vehicle accessory. The metal platform may comprise alternating shaped segments such as alternately shaped and dimensioned segments. In preferred embodiments, the metal platform comprises two alternating shapes at least one of which is a rectangular segment and another of which has at least one polygonal, hexagonal or octagonal shaped side. Preferred embodiments include alternating shaped segments including a first segment that is not attachable to the vehicle accessory and a second segment that is attachable to the vehicle accessory. The drawings illustrate such an embodiment wherein the first segment is a rectangular segment that has a width that is less than the width of the second segment.

Figure 1:
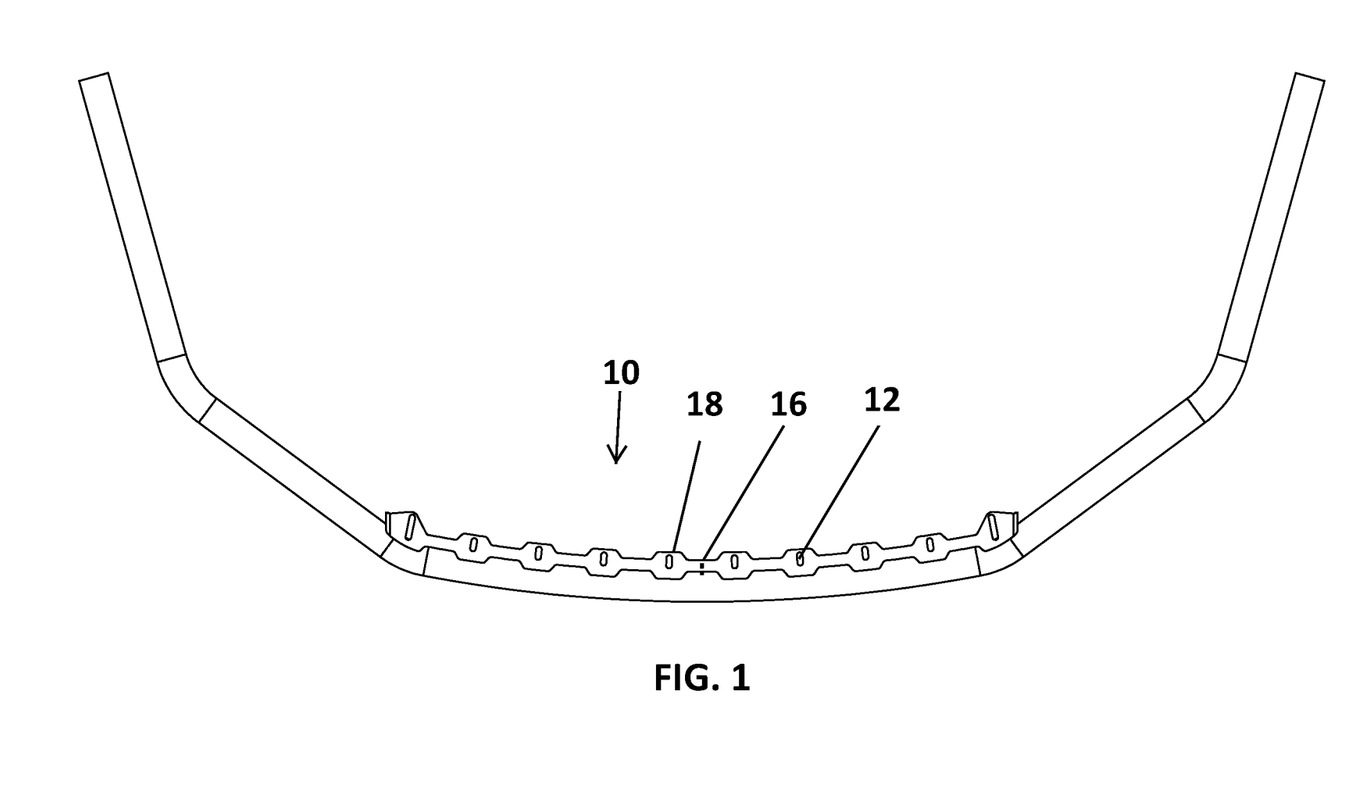
FIG. 1 illustrates a top view of an accessory mount according to the description including the mounting base 10, spacing segments 16, and bracket mounting portions 18.

A preferred embodiment for an accessory mount constructed, manufactured, or configured for a vehicle exterior or vehicle aftermarket accessory comprises a mounting base 10 comprised of a plurality of spacing segments 16 and a plurality of bracket mounting portions 18. See FIG. 1. The mounting base 10 is constructed of bracket mounting portions 18 and spacing segments 16 wherein each interior bracket mounting portion 18 is fixed to a first spacing segment 16 on a first side of the bracket mounting portion 18, and is fixed to a second spacing segment 16 on a second side of the bracket mounting portion 18. Exterior or end bracket mounting portions 18 on the other hand will be fixed to a single spacing segment 16, only on either the first side of the bracket mounting portion 18 or the second side of the bracket mounting portion 18. Further, the bracket mounting portions 18 and each spacing segment 16 have substantially the same height but the bracket mounting portions 18 have greater width than the spacing segments 16. The mounting base 10 may be constructed by welding together the bracket mounting portion 18 and the spacing segments 16 or alternatively, and preferably, the mounting base 10 is preferably fabricated, cut, or stamped from a single sheet of metal to have the bracket mounting portion 18 and spacing segments 16 therein and to have an overall curve, arc, or radius of the vehicle exterior or aftermarket accessory to which it is attachable or attached. Moreover, when permissible, the mounting base 10 is preferably constructed and attached at a position substantially opposite the most forward surface to which it is attached. For example, the drawings illustrate the mounting base 10 constructed and attached to the portion of a vehicle bumper surface that faces away from the front of the bumper as it attaches to a vehicle. The bracket mounting portions 18 may comprise a platform or sheet of metal and may have a hexagonal shape and be oriented in an accessory mount construction so that the flat side of the hexagon is fixed to the vehicle accessory surface and the corner or angle of each interior bracket mounting portion 18 hexagon fixes or attaches to a spacing segment 16.

The accessory mount comprises the plurality of bracket mounting portions 18 and the plurality of spacing segments 16, which are fixed together at first and second opposite bracket mounting portions 18 edges, such as by welds, to have the same shape or contour as the vehicle exterior or vehicle aftermarket accessory. Mounting brackets are attachable to the bracket mounting portions 18 and facilitate the removable attachment of various accessories. The bracket mounting portions 18 preferably include a base mounting slot 12 to facilitate fastening of brackets to the mounting base 10 and the modular design as described herein provides that an accessory with a given length may be mounted between a first bracket and a second bracket by attachment of the first bracket to a first base mounting slot 12 and attachment of the second mounting bracket to a second base mounting slot 12; and if the accessory (or a second different accessory) has an alternate length it may be alternately mounted between the first bracket and the second bracket by attachment of at least one of the first bracket or second bracket to an alternate base mounting slot 12. Preferred accessory mount constructions or embodiments comprise a substantially flat accessory mount constructed of spacing segments 16 and bracket mounting portions 18 having substantially equivalent thicknesses or heights and wherein the spacing segments 16 and bracket mounting portions 18 may have alternate widths and the bracket mounting portions 18 wider than the spacing segments 16 such that only the same side edges of each bracket mounting portion 18 are attachable or fixable to the vehicle accessory. In an alternate embodiment, the spacing segments 16 are wider than the bracket mounting portions 18 and the same side edges of the spacing segments 16 are attachable to the vehicle accessory.

Each base mounting slot 12 may be comprised of at least one, but preferably two arcs, with each arc on alternate ends of an otherwise rectangular or slot-shaped aperture that extends through the base mounting slot 12. Base mounting slots 12 may have an arc radius of about 0.1 cm to about 2 cm but are preferably about 0.19 cm and the distance between adjacent base mounting slot 12 centers may be between about 2 cm and 8 cm but are preferably about 3 cm to 6 cm as measured a long a line or arc between base mounting slot 12 centers. See FIG. 1.

Figure 2A:
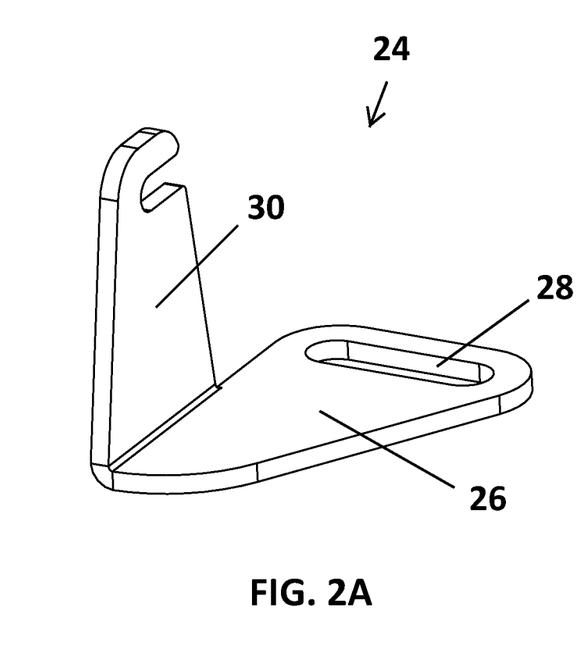
FIG. 2A illustrates a first embodiment of a right-side L-shaped bracket 24 including a bracket base 26, bracket base mounting slot 28, and bracket mount arm 30.
Figure 2B:
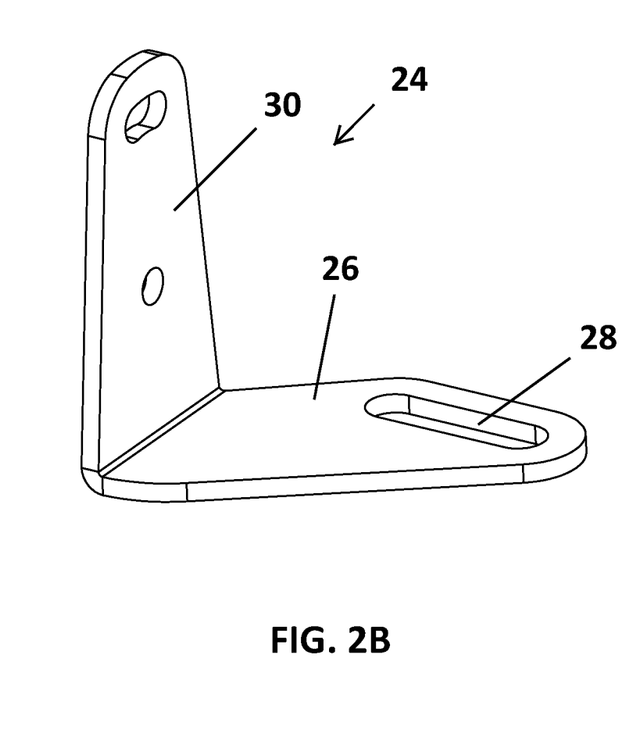
FIG. 2B illustrates a second embodiment of a right-side L-shaped bracket 24, including a bracket base 26, bracket base mounting slot 28, and bracket mount arm 30.
Figure 2C:
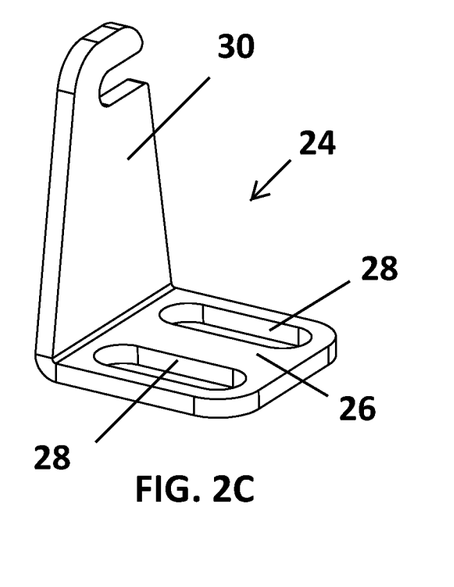
FIG. 2C illustrates a third embodiment of a right-side L-shaped bracket 24, including a bracket base 26, bracket base mounting slot 28, and bracket mount arm 30.
Figure 2D:
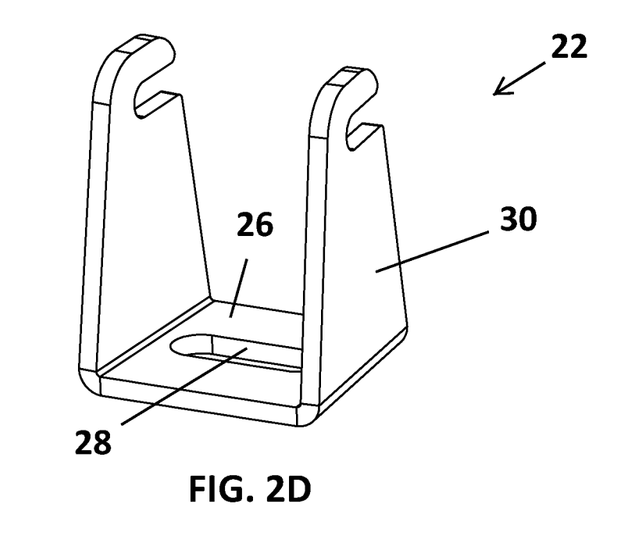
FIG. 2D illustrates u-shaped bracket 24, including a bracket base 26, bracket base mounting slot 28, and bracket mount arm 30.

Preferred brackets for attachment to the mounting base 10 are illustrated in FIGS. 2A-2D and include a bracket base 26 and a bracket mount arm 30. The bracket base 26 is attachable to one of the plurality of bracket mounting portions 18 of the mounting base 10 and an accessory is mountable to the bracket mount arm 30. Alternative bracket types may include a right angle U-shaped bracket 22, a right-side L-shaped bracket 24, and a left-side L-shaped bracket 25. As described earlier, each of the preferred brackets comprises a bracket base 26, having a bracket base perimeter with at least one bracket base mounting slot 28 therein. FIGS. 2A-2C for example, illustrate alternate embodiments of right-side L-shaped brackets 24, each comprised of a bracket base 26 fixed to a bracket mount arm 30 at an angle that is preferably, but not limited to, a right-angle. Each bracket base mounting slot 28 is comprised of at least one, but preferably two arcs, with each arc on alternate ends of an otherwise rectangular or slot-shaped aperture that extends through the bracket base 26. Left-side L-shaped brackets 25 are similarly constructed but have a mirror-image to the right-side L-shaped brackets 24. Each bracket base 26 may comprise a metallic sheet or platform and have a rectangular (see FIGS. 2C-2D), trapezoidal (see FIG. 2A), or quadrilateral (see FIG. 2B) shape. Moreover, the preferred right-side L-shaped bracket 24 and the left-side L-shaped bracket 25 each have a bracket mount arm 30 that extends substantially perpendicularly from an edge of the bracket base perimeter and the bracket base mounting slot 28 is adjacent along an opposite edge of the bracket base perimeter from which the bracket mount arm 30 extends substantially perpendicularly. Each bracket mount arm 30 may comprise a rectangular, trapezoidal, trapezium or a quasi-trapezoidal or quasi-trapezium metallic sheet and have at least one mounting aperture or mounting gap extending there through. As illustrated in FIGS. 2A-2D, each the bracket mount arm 30 comprises a trapezium or trapezoidal shaped metallic sheet with rounded corners on a base-edge of the mounting arm 30 that is not attached to the bracket base 26. Further, it is preferred that the U-shaped bracket mount arms 30 extend equivalent distances from the bracket base 26 from which each extends.

Preferred accessory mount constructions and applications orthogonally orient the base mounting slots 12 and bracket base mounting slots 28. Each of the base mounting slots 12 are preferably oriented in a first direction and the first bracket and second bracket may each have a bracket base mounting slot 28 that is oriented in at least a second direction relative to the respective base mounting slot 12 to which it is attachable. Further, the first direction is aligned with the longest dimension of the base mounting slot 12 and the second direction is aligned with the longest dimension of the bracket mounting slot 28 such that the second direction is between about 40 degrees and 140 degrees relative to the first direction or substantially orthogonal.

A preferred accessory mount construction according to the disclosure includes a mounting base 10 that is constructed to the same arc or curve of the vehicle accessory and the first bracket comprises a left-side L-shaped bracket 25 and the second bracket is a right-side L-shaped bracket 24 as described and illustrated herein. The right-side L-shaped bracket 24 and the left-side L-shaped bracket 25 each have a substantially flat bracket base 26 that contacts, and is attachable to, a respective bracket mounting portion 18, and the bracket base 26 has a bracket base perimeter and a bracket base mounting slot 28 within the bracket base perimeter. A portion of the bracket base mounting slot 28 aligns with the base mounting slot 12 to receive a fastener to attach or fix the right-side L-shaped bracket 24 and the left-side L-shaped bracket 25 to the mounting base 10. An alternately constructed accessory mount includes at least one right angle U-shaped bracket 22. Yet another alternately constructed accessory mount according to the invention comprises a mounting base 10 that is constructed to the arc or curve of the vehicle accessory and the first bracket comprises either a right-side L-shaped bracket 24 or a left-side L-shaped bracket 25 and the second bracket comprises at least one right angle U-shaped bracket 22. Constructions according to this description permit the attachment or mounting of at least one but alternatively, multiple accessories to a single mounting base 10 at positions interior to the ends of the mounting base 10.

Figure 3A:
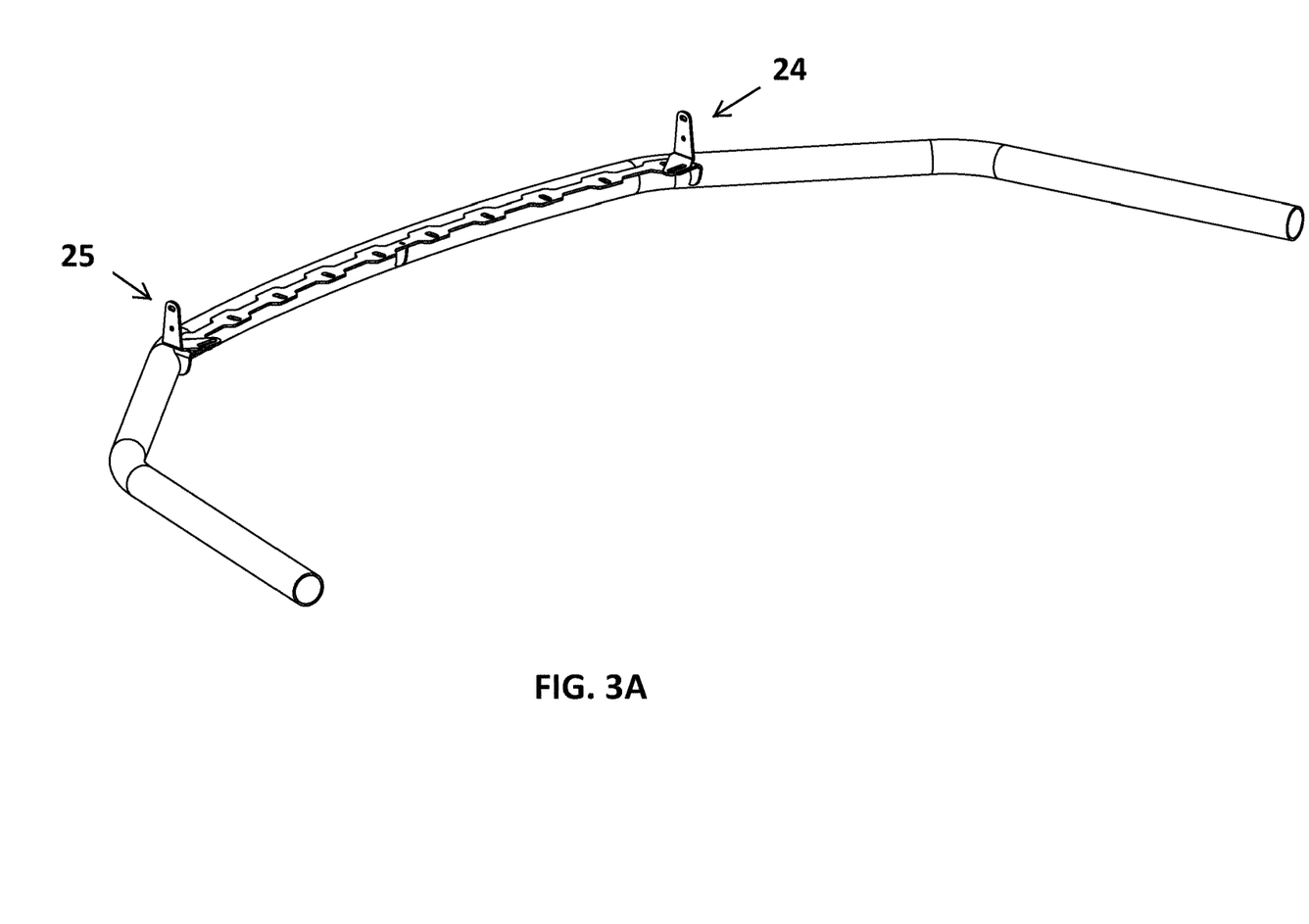
FIG. 3A illustrates a first perspective view of an accessory mount with a single right-side L-shaped bracket 24 and a single left-side L-shaped bracket 25
Figure 3B:
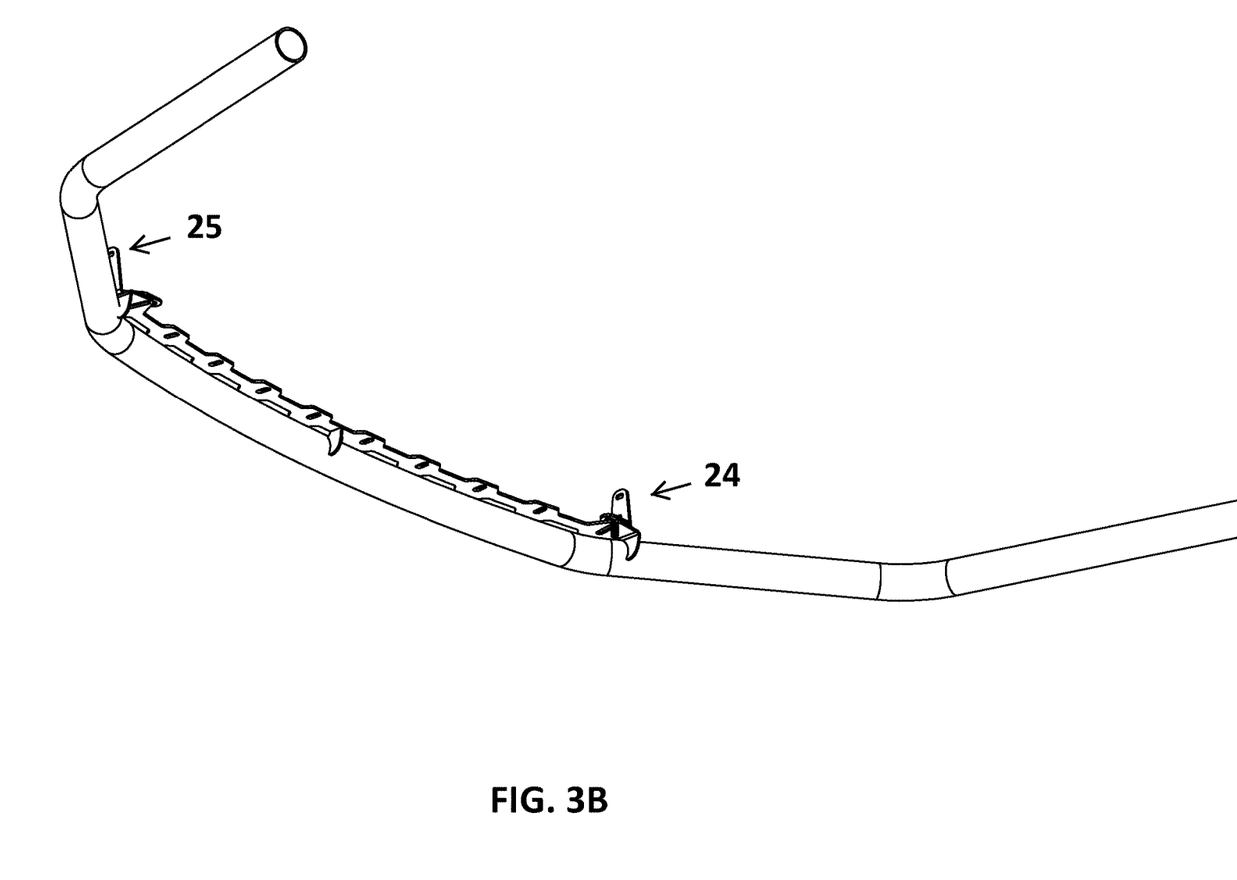
FIG. 3B illustrates a second perspective view of the accessory mount in FIG. 3A
Figure 3C:
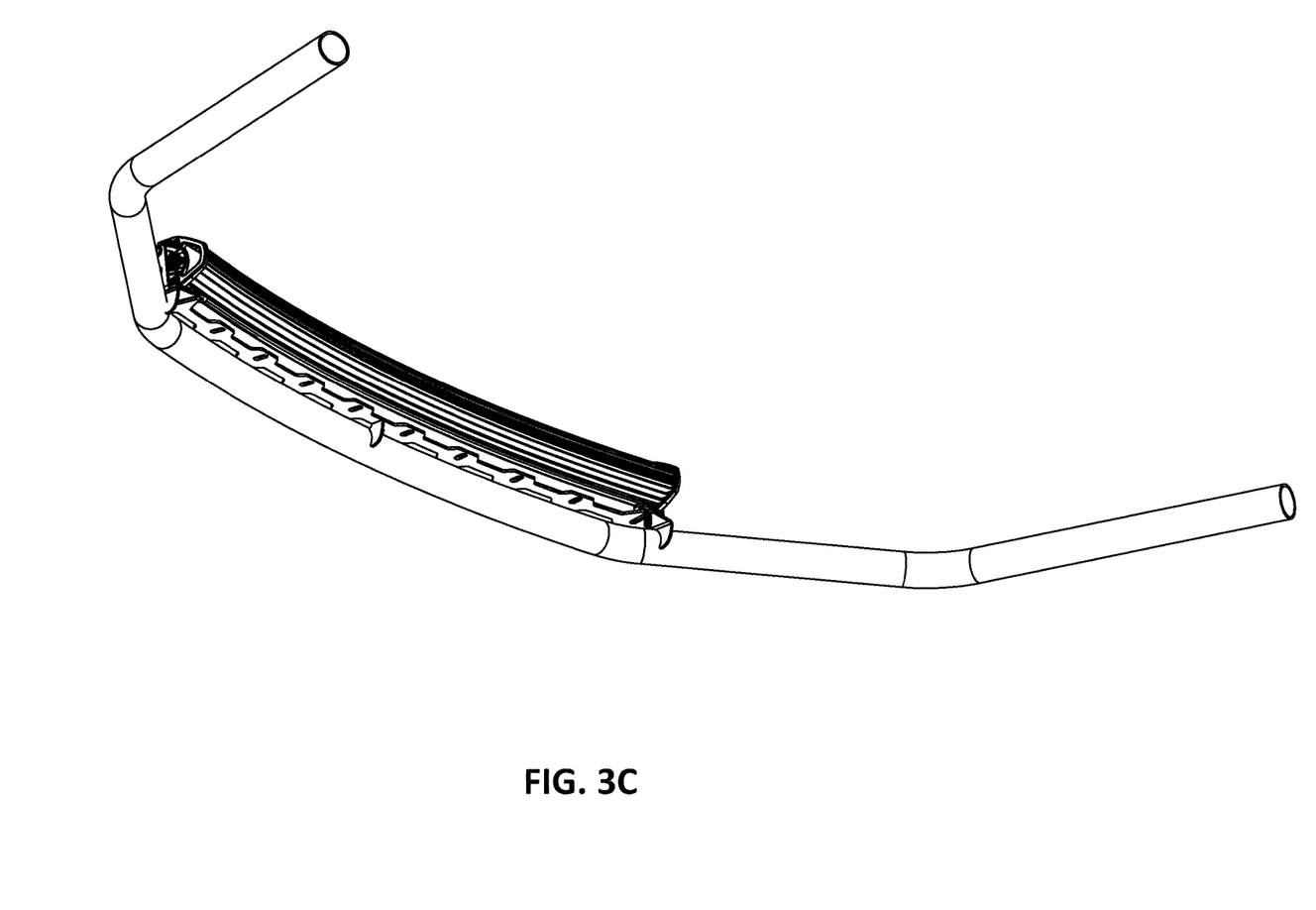
FIG. 3C illustrates an accessory mounted to the right-side L-shaped bracket 24 and the single left-side L-shaped bracket 25 of the accessory mount in FIGS. 3A & 3B.
Figure 4A:
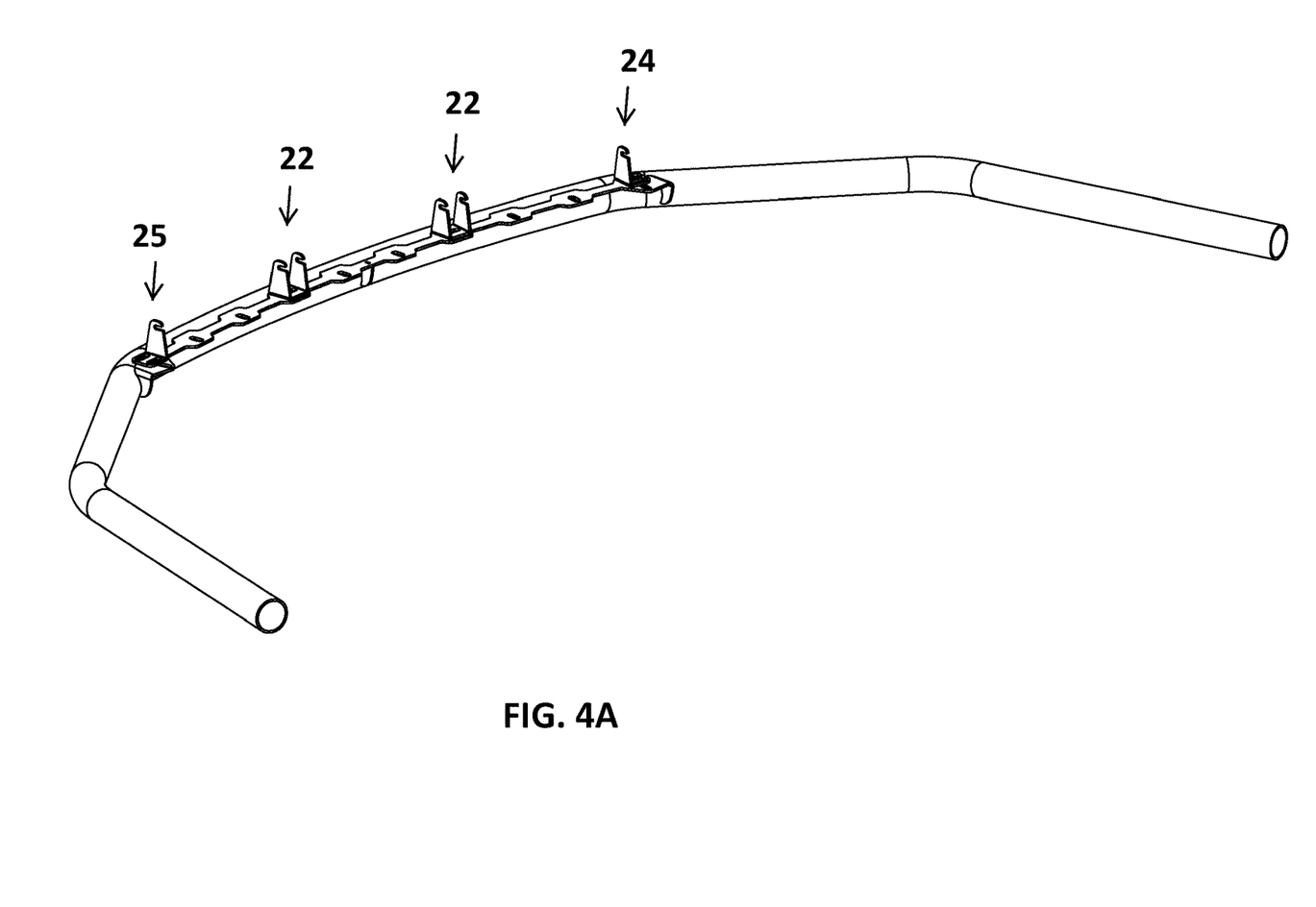
FIG. 4A illustrates the same accessory mount in FIGS. 3A-3C with a single right-side L-shaped bracket 24 and a single left-side L-shaped bracket 25 at respective first and second ends of the mounting base 10 and a plurality of right angle u-shaped brackets 22 positioned there between to mount a plurality of accessories to the accessory mount.
Figure 4B:
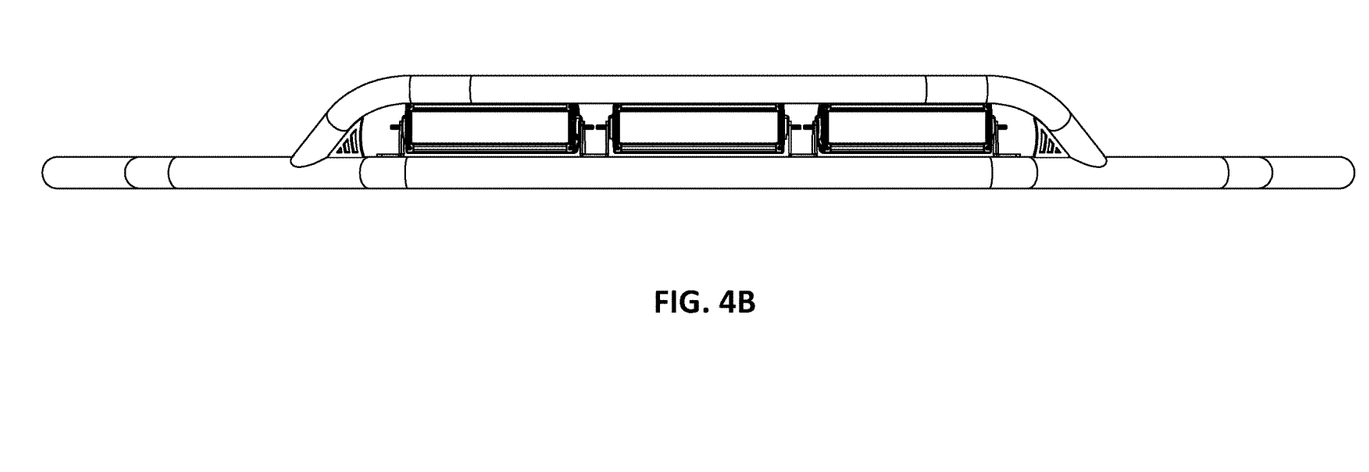
FIG. 4B illustrates a plurality of accessories mounted to an accessory mount having the same brackets as FIG. 4A.
Figure 5:
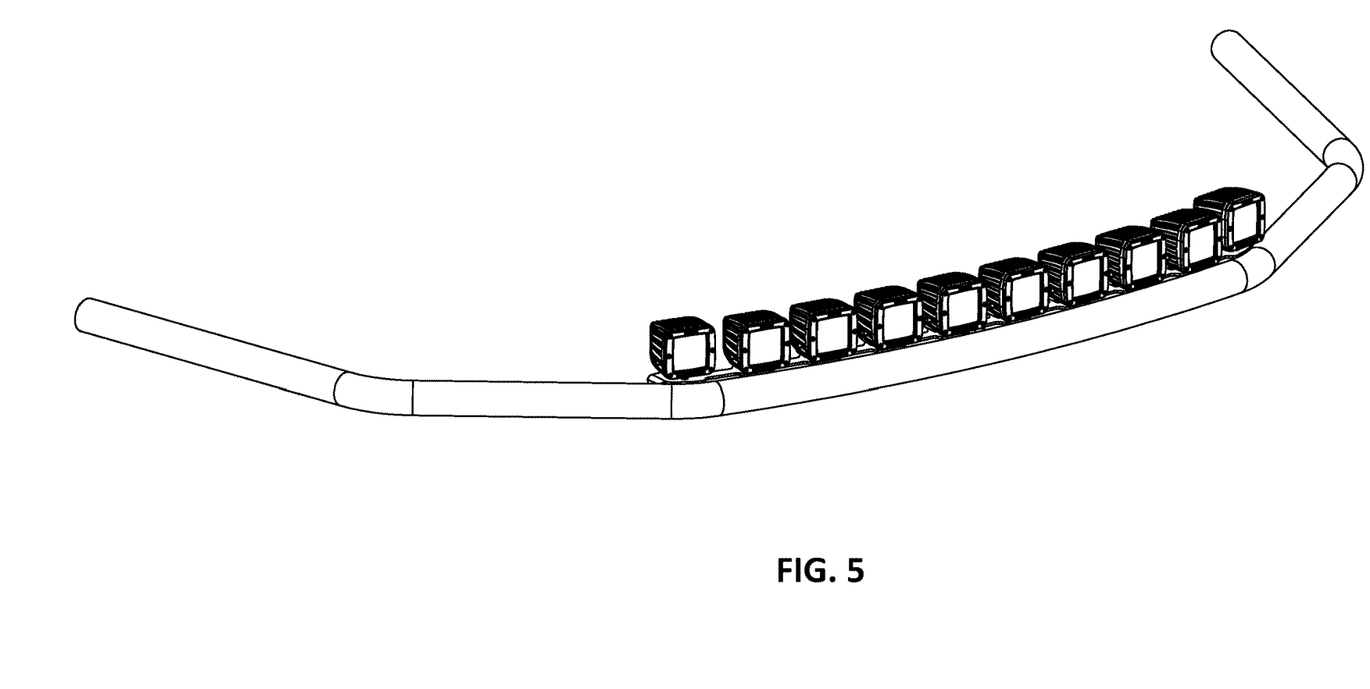
FIG. 5 illustrates the same accessory mount of FIG. 4A with a plurality of lighting accessories mounted thereon using one or more of the brackets described herein.
Figure 6A:
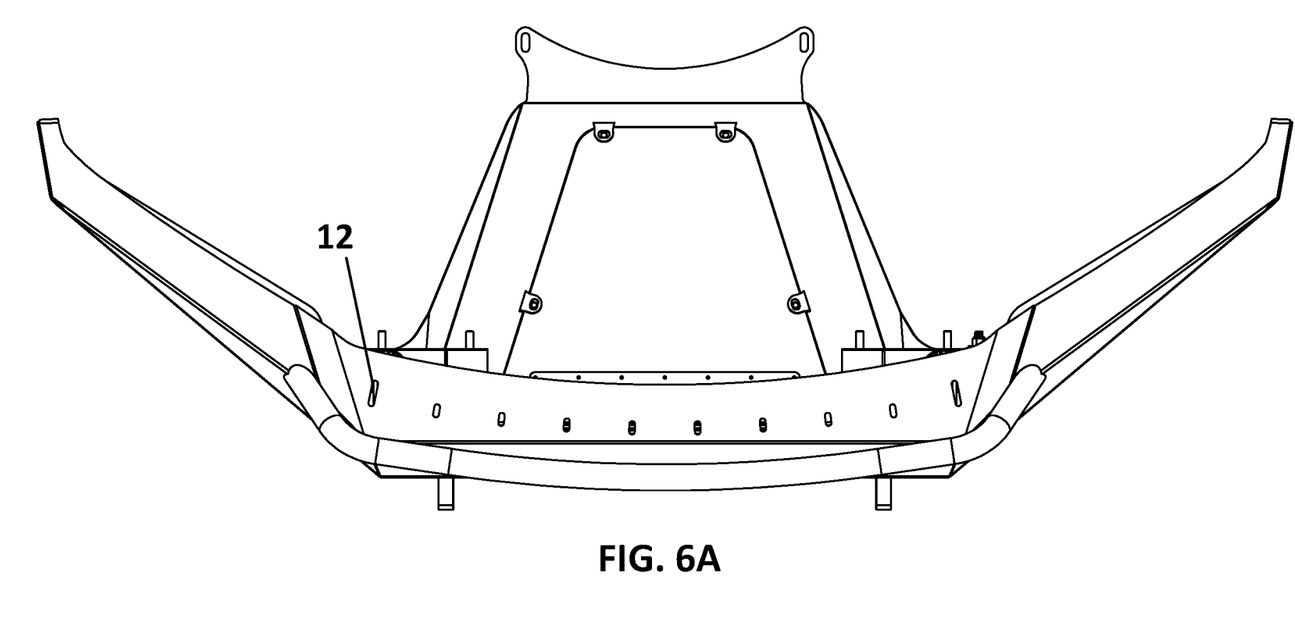
FIGS. 6A and 6B illustrate another embodiment of the accessory mount with the mounting base 10 integrated into a bumper panel.
Figure 6B:
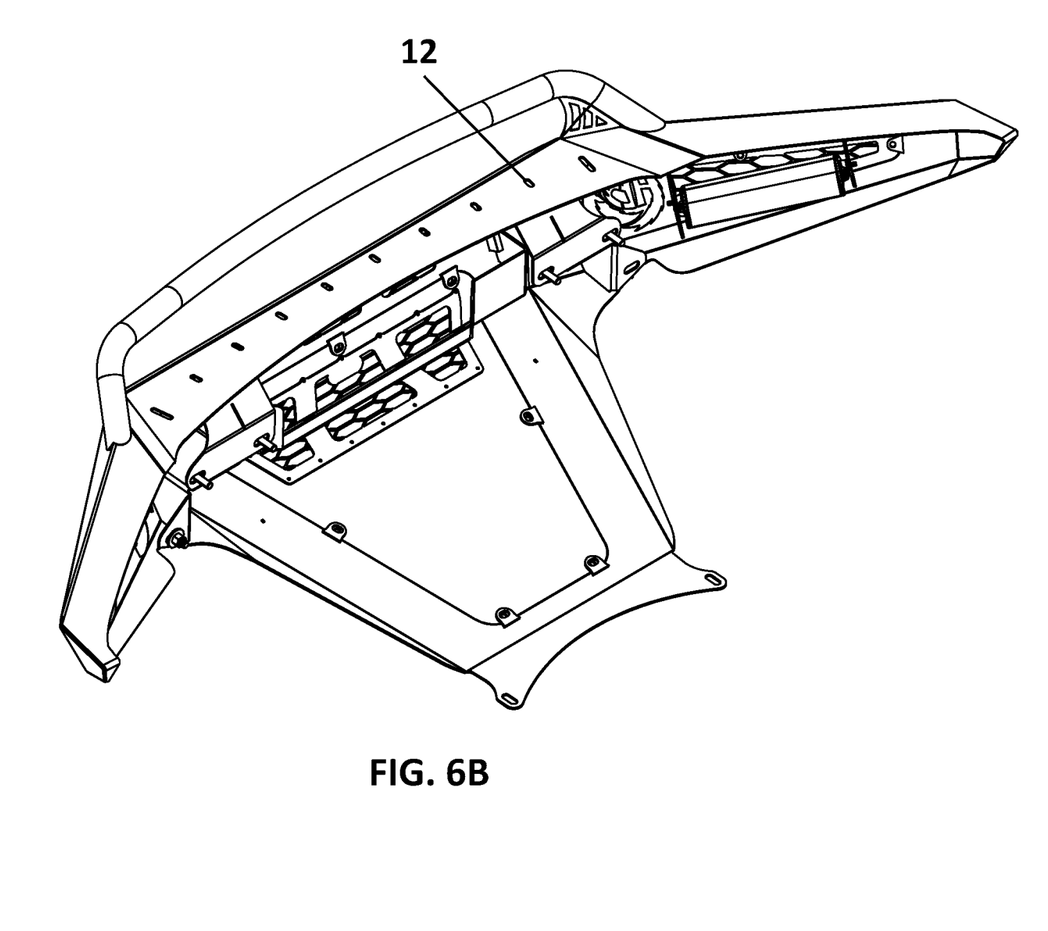
Figure 7A:
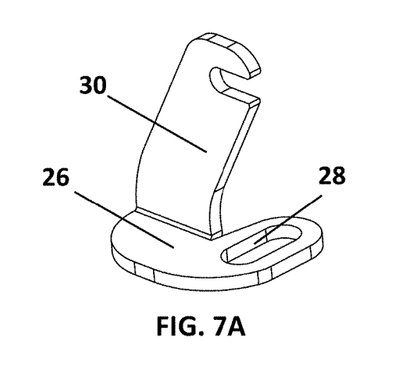
FIGS. 7A-7B illustrate additional L-shaped brackets 24.
Figure 7B:
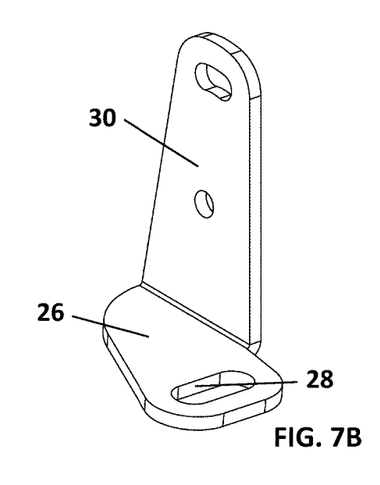
Figure 7C:
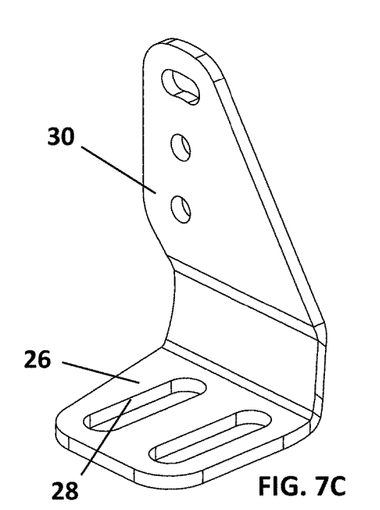
FIGS. 7C-7D illustrate additional L-shaped brackets 24 having a bracket mount arm 30 comprised of at least first and second segments.
Figure 7D:
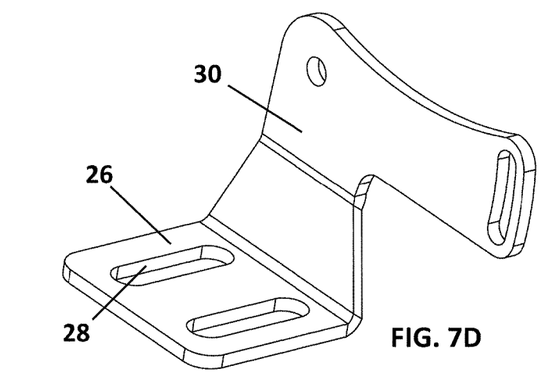

The illustrated embodiment and applications thereof demonstrate the universality of the accessory mount as described herein. In a first application, a single lighting accessory is attachable between a left-side L-shaped bracket 25 and a right-side L-shaped bracket 24. See, FIGS. 3A-3C. In a second application of the same embodiment, a right-side L-shaped bracket 24, a left-side L-shaped bracket 25, and two U-shaped brackets 22 facilitate the attachment of a plurality of accessories (e.g. lighting units) between either the right-side L-shaped bracket 24 or the left-side L-shaped bracket 25 and at least one of the two U-shaped brackets 22. See FIG. 4A. Alternative accessory attachment variations are also possible depending on the dimensions of the accessory to be attached and the construction of the accessory mount. For example, FIGS. 6A and 6B illustrate an embodiment wherein the accessory mount mounting base 10 is integrated into a bumper construction. In the illustrated embodiment, the bumper middle portion of the bumper may be fabricated or constructed as a whole and mounting slots 12 cut, such as by laser, into a bumper middle portion panel.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. An accessory mount for a vehicle exterior or vehicle aftermarket accessory, comprising:
 a mounting base comprised of a plurality of spacing segments and a plurality of interior bracket mounting portions, each interior bracket mounting portion fixed to a first spacing segment on a first side of the interior bracket mounting portion and fixed to a second spacing segment on a second side of the interior bracket mounting portion, the interior bracket mounting portions each having a base mounting slot; and a first bracket and a second bracket, each having a bracket base with a bracket base mounting slot and each respectively attachable to one of the base mounting slots in one of the plurality of bracket mounting portions, the first bracket and second bracket are selected from the group consisting of L-shaped and U-shaped brackets each having a mount arm that extends substantially perpendicularly from an edge of the bracket base and includes a mount arm slot;

wherein an accessory having a length may be mounted between the respective mount arms of the first bracket and the second bracket by attachment of the first bracket to a first base mounting slot and attachment of the second bracket to a second base mounting slot and wherein if the accessory has an alternate length it may be alternately mounted between the first bracket and the second bracket by attachment of at least one of the first bracket or second bracket to an alternate base mounting slot; and wherein the interior bracket mounting portions and spacing segments are fixed together to construct the accessory mount to have a shape that is substantially equivalent to the shape of the vehicle accessory to which the accessory mount is attached.

2. The accessory mount in claim 1 wherein the base mounting slots are oriented in a first direction and the first bracket and second bracket each have a bracket base mounting slot that are oriented in at least a second direction when attached to respective base mounting slots.

3. The accessory mount in claim 2 wherein, each base mounting slot includes two arcs, each arc on alternate ends of a slot-shaped aperture that extends through the bracket mounting portion.

4. The accessory mount in claim 3 wherein, each base mounting slot has an arc radius of about 0.1 cm to about 2 cm.

5. The accessory mount in claim 3 wherein, each base mounting slot between about 2 cm and 8 cm from an adjacent base mounting slot as measured a long a line or arc between base mounting slot centers.

6. The accessory mount in claim 2 wherein, the bracket mounting slot comprises two arcs, each arc on alternate ends of a slot-shaped aperture that extends through a bracket base.

7. The accessory mount in claim 2 wherein, the first direction is aligned with the longest dimension of the base mounting slot and the second direction is aligned with the longest dimension of the bracket mounting slot.

8. The accessory mount in claim 7 wherein, the second direction is between about 40 degrees and 140 degrees relative to the first direction.

9. The accessory mount in claim 8 wherein, the first direction and second direction are substantially orthogonal.

10. The accessory mount in claim 1 wherein the bracket mounting portions are hexagonal-shaped metal platforms and the spacing segments are substantially rectangular-shaped metal segments.

11. The accessory mount in claim 1 wherein: the first bracket comprises a bracket selected from the group consisting of right-side L-shaped brackets and left-side L-shaped brackets and the second bracket comprises a U-shaped bracket.

12. The accessory mount in claim 2 wherein, the first direction is aligned with the longest dimension of the base mounting slot and the second direction is aligned with the longest dimension of the bracket mounting slot.

13. An accessory mount for a vehicle exterior or vehicle aftermarket accessory, comprising:

a mounting base comprised of a plurality of spacing segments and a plurality of interior bracket mounting portions, each interior bracket mounting portion fixed to a first spacing segment on a first side of the interior bracket mounting portion and fixed to a second spacing segment on a second side of the interior bracket mounting portion, the interior bracket mounting portions each having a base mounting slot; and a first bracket, a second bracket, and a third bracket, each having a bracket base with a bracket base mounting slot and each respectively attachable to one of the base mounting slots in one of the plurality of bracket mounting portions, the first bracket and second bracket comprising L-shaped brackets and the third bracket comprising a U-shaped bracket, each bracket having at least one mount arm that extends substantially perpendicularly from an edge of the bracket base and includes a mount arm slot;

wherein an accessory having a length may be mounted between the respective mount arms of the first bracket and the third bracket by attachment of the first bracket to a first base mounting slot and attachment of the third bracket to a second base mounting slot and wherein if the accessory has an alternate length it may be alternately mounted between the first bracket and the third bracket by attachment of at least one of the first bracket or second bracket to an alternate base mounting slot; and wherein the interior bracket mounting portions and spacing segments are fixed together in a shape that is substantially equivalent to the shape of the vehicle accessory to which it is attached.

14. The accessory mount in claim 13 wherein, each base mounting slot comprises a substantially rectangular aperture.

15. The accessory mount in claim 14 wherein, each base mounting slot further comprises an arc on alternate ends of the rectangular aperture.

16. A vehicle accessory mounting bracket, comprising: rectangular segments and polygonal segments, at least one of the rectangular segments connected on opposite edges to a first polygonal segment edge and a second polygonal segment edge, respectively, to form a substantially flat metal assembly; and bracket mounting slots in the substantially flat metal assembly adapted to receive fastening hardware;

wherein either the polygonal segments or the rectangular segments, but not both, are attachable to a vehicle accessory selected from bumpers and racks.

17. The vehicle accessory mounting bracket in claim 16 wherein, the bracket mounting slots are distributed longitudinally along the substantially flat metal assembly.

18. The vehicle accessory mounting bracket in claim 16 wherein, the polygonal segments are selected from hexagons and octagons.

19. The vehicle accessory mounting bracket in claim 16 wherein, at least one of either the rectangular segments or polygonal segments have gaps between the vehicle accessory and the substantially flat metal assembly.

* * * * *